United States Patent [19]

Ivachev

[11] 4,174,025

[45] Nov. 13, 1979

[54] PIVOTED LEVER BRAKE STRUCTURE

[76] Inventor: Leonid M. Ivachev, ulitsa Sovetskaya, 80, kv. 8, Tolyatti Kuibyshevskoi oblasti, U.S.S.R.

[21] Appl. No.: 823,860

[22] Filed: Aug. 11, 1977

[51] Int. Cl.² .............................................. F16D 55/26
[52] U.S. Cl. ............................... 188/72.6; 188/106 F; 188/170
[58] Field of Search .......................... 188/72.6, 72.9, 75, 188/170, 171, 173, 166, 106 R, 106 P, 24, 25, 26, 27, 59

[56] References Cited

U.S. PATENT DOCUMENTS

| 837,853 | 12/1906 | Larson | 188/171 |
|---|---|---|---|
| 1,231,590 | 7/1917 | Friedlaender | 188/171 |
| 1,563,544 | 12/1925 | Atkinson | 188/171 |
| 1,902,230 | 3/1933 | Gundersen | 188/166 X |
| 2,413,614 | 12/1946 | Eksergian | 188/59 X |
| 3,109,517 | 11/1963 | Butler et al. | 188/72.6 X |
| 3,680,663 | 8/1972 | Kine | 188/72.9 X |
| 3,722,636 | 3/1973 | Kobelt | 188/170 |

FOREIGN PATENT DOCUMENTS 390288 7/1908 France ........................ 188/24

Primary Examiner—George E. A. Halvosa
Attorney, Agent, or Firm—Robert E. Burns; Emmanuel J. Lobato; Bruce L. Adams

[57] ABSTRACT

A braking gear having two turnable levers coupled by a spring and carrying brake shoes which engage the disk of the machine to be braked at both sides thereof and a double-acting hydraulic cylinder mechanically connected with the turnable levers by way of an articulation double-link members. The double-link member has a common articulation joint which is connected with the piston rod of the hydraulic cylinder. The ends of the articulation double-link member are connected with the levers and are acted upon by the spring, coupling the turnable levers, due to which the levers are reliably fixed both when the braking gear is switched on or off.

4 Claims, 5 Drawing Figures

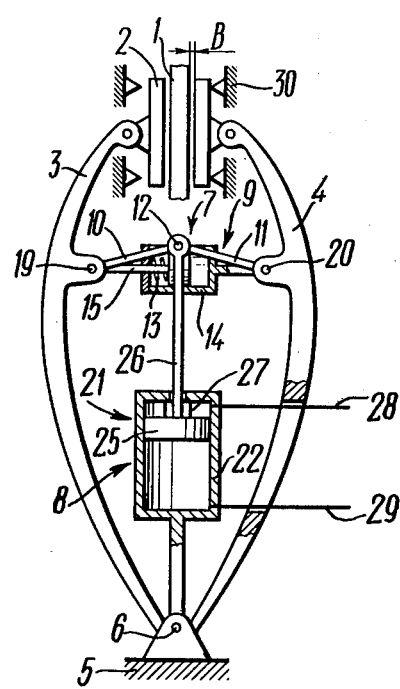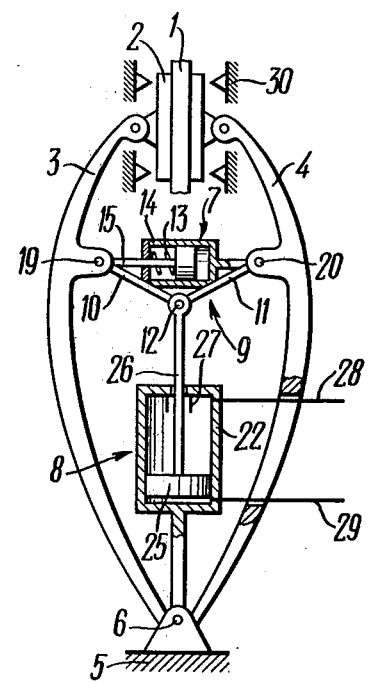

PIVOTED LEVER BRAKE STRUCTURE

BACKGROUND OF THE INVENTION

The present invention relates to braking gears utilized in various branches of industry. The invention is of particular advantage for use in the cement, construction, and metallurgical industries for braking high-torque mechanisms such as mills of various types, conveyers, elevators, drilling rigs, and other similar apparatus.

The invention will now be described by way of example as used for braking tumbling mills well known in the cement industry, however, it should be understood that its application is not limited to this specific example.

At present in the cement industry there are used tumbling mills with a drive in which a low-speed electric motor co-axial with the mill is directly connected to the latter to impart rotary motion thereto. This motor provides for two operating conditions namely working fast rotation and slow rotation used in repairs. Due to a frequency converter, a smooth change in the speed of the motor, and hence, of the mill, is assured from zero to the maximum speed, say 20 rpm. A reliable braking gear is required to fix the mill in position, primarily during repair operations such as replacement of lining, tightening up of the fastenings, as well as in erecting the mill and unloading the grinding elements.

Known in the art is a braking gear for a tumbling mill operating directly from a co-axial low-speed electric motor and providing for stopping and fixing the mill in any position, for example, for tightening up the bolts and for other maintenance work.

This braking gear comprises a tightening beam with a brake shoe and two hydraulic cylinders which press the beam with the shoe to the brake member, e.g. the cylindrical portion of the mill body from below.

In this braking gear unavoidable oil leakage past the seals of the hydraulic cylinders, as well as possible damage to the pipelines, may cause drop of pressure in the hydraulic cylinders, thus releasing the brake which is not permissible. In view of the fact that in tumbling mills the bearing inserts are arranged only in the bottom part, the mill in its upper part is not checked against lifting under the pressure of the hydraulic cylinders from below, hence the brake shoe tightening effort cannot exceed the mass of that portion of the mill where the braking gear is installed. If the torque of the unbalanced mass of the mill exceeds the braking torque which can be obtained by pressing the shoes to the brake member of the mill, the latter will be rotated arbitrarily which is inadmissible for safety considerations. Since the hydraulic cylinders are mounted for a direct action on the brake shoes, the hydraulic cylinders and the seals are of large dimensions.

Also known in the art is braking gear comprising two brake shoes arranged symmetrically with respect to the member to be braked, such as a disk, pivotally joined with the levers hinged to a base, a resilient means interconnecting the levers, and a mechanism for turning the levers in bringing the brake shoes to and withdrawing from the member to be braked. The levers are mounted on the base so that they have movable ends of which like ones have on one side from the pivot pin pivotally mounted brake shoes with friction linings for interaction with both sides of the disk, while on the other side, i.e. on the reverse ends there is a resilient means incorporating a tension spring interconnecting the levers, and a mechanism represented as a single-acting hydraulic cylinder used for turning the levers in bringing the brake shoes to and withdrawing thereof from the brake disk.

In the initial position under the action of the resilient means the braking gear is always open, i.e. the brake shoes are withdrawn from the disk. When pressure fluid is applied to the hydraulic cylinder, it overcomes the pressure of the resilient means and the shoes grip the disk, thus braking it.

When pressure is released in the hydraulic cylinder, the resilient means moves the shoes away from the disk, thus releasing the latter.

The aforesaid braking gear is generally designed as normally open, though those skilled in the art can easily convert it into normally closed. However both designs cannot be efficiently used for safety reasons. Thus, the use of the prior art braking gear in the normally open version for fixing tumbling mills and similar devices during maintenance work involves the danger of brake release in case of a drop of pressure in the hydraulic cylinder.

In case where the prior art braking gear is used in the normally closed version, an accidental drop of pressure in the hydraulic cylinder can occur causing a stoppage of the processing line which adversely effects both the productivity thereof and quality of the product.

Besides, the use of the prior art braking gear for braking high-torque mechanisms requires great efforts to be developed by the resilient means and lever turning mechanism at the expense of increased size and mass of the resilient means and lever turning mechanism which complicates their manufacture, maintenance and increases cost.

Thus, the principal disadvantage of the prior art braking gear lies in that the mechanical connections of its members do not ensure reliable fixing both in the open and closed positions, i.e. in positions when the brake shoes are pressed to the member to be braked or withdrawn therefrom.

SUMMARY OF THE INVENTION

It is a general object of the invention to provide a reliable braking gear which will ensure reliable fixed positions both when the brake shoes are pressed to the member to be braked, and respectively, when they are withdrawn therefrom.

A further object of the invention is to provide an efficient braking gear with an increased braking torque.

Yet another object of the invention is to provide a braking gear in which the resilient means is under smaller loads.

These and other objects are attained by providing a braking gear comprising two brake shoes arranged symmetrically with respect to the member to be braked and pivotally joined with the levers hinged to the base, a resilient means interconnecting the levers, and a mechanism for turning the levers when bringing the brake shoes to or withdrawing them from the member to be braked in which, in accordance with the invention, the levers are interconnected by means of an articulated double-link member, having a common articulation joint kinematically connected with the lever turning mechanism, said mechanism being essentially a known double-acting mechanism for reciprocating the common articulation joint, while the resilient means is so arranged as to press the brake shoes to the member to be braked, thereby providing for holding the common articulation joint in its end positions and for fixing the levers upon turning thereof.

Such braking gear provides for a reliable fixing of the levers both in the open and closed positions of the braking gear, and also due to the use of an articulation double-link member connected with the ends of the levers, and with the lever turning mechanism, provides for a many-fold increase in braking torque, since the force in the linkage is applied rectilinearily.

In accordance with an embodiment of the invention, one of the ends of the articulation double-link member is connected with the levers by means of tie rods, and the other with the base, due to which the load on the resilient means is reduced.

To provide for rectilinear operation of the double-acting mechanism according to one embodiment this mechanism is pivotally mounted on one of the levers of the braking gear.

Angular deflections in the braking gear are most efficiently avoided by mounting the levers and one end of the articulation double link member on the base by means of a common pivot pin.

In accordance with another embodiment of the invention, there is used an actuating cylinder as the double-acting mechanism, the stationary member of the cylinder being hinged to the base, and the movable member being connected with the common articulation joint.

To provide for a balanced operation of all the elements of the braking gear, in accordance with the above-mentioned embodiment of the invention, the levers and stationary member of the double-acting mechanism are connected by a common pivot pin.

Most advantageous for purposes of the present invention is a resilient means comprising a compression spring connected with the ends of the articulation double-link member.

BRIEF DESCRIPTION OF THE DRAWINGS

Other objects and advantages of the invention will become clear from the following detailed description and accompanying drawings in which corresponding parts are identified by respective reference numerals and in which:

FIG. 4 is a side view schematically illustrates the braking gear, in accordance with another embodiment of the invention, with the brake shoes withdrawn from the member to be braked;

FIG. 5 is a side view of the braking gear of FIG. 4 with the brake shoes pressed to the member to be braked;

DESCRIPTION OF THE PREFERRED EMBODIMENTS

Figure 1:
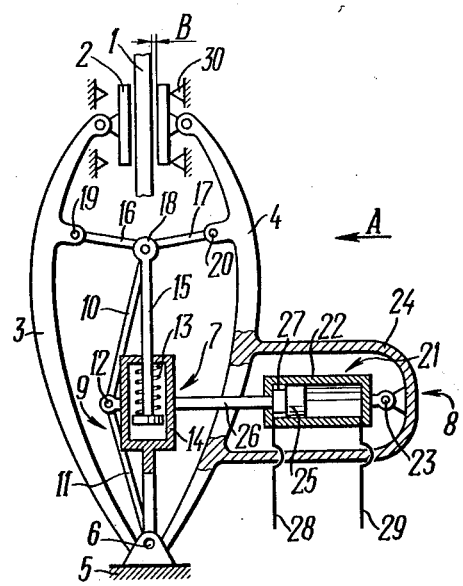
FIG. 1 is a side view, partly in section, schematically illustrating the braking gear in accordance with one embodiment of the invention, with the brake shoes withdrawn from the member to be braked.

FIGS. 1-5 show the braking gear, in accordance with the invention, used for braking a tumbling mill known in the art, of which only its member to be braked such as disk 1, is represented for the sake of clarity.

The braking gear comprises two identical brake shoes 2 arranged symmetrically with respect to a disk 1. Brake shoes 2, being essentially known in the art structure with a friction surface, are pivotally joined with levers 3 and 4 hinged to a base 5. To provide for self alignment these brake shoes are mounted with the aid of spherical joints on like ends of levers 3 and 4, the opposite ends thereof being hinged on a common pivot pin 6 connected to the base 5. Levers 3 and 4 are interconnected by means of a resilient means 7, and the drive of the levers for bringing the brake shoes to and withdrawing them from the disk 1 is effected with the aid of a mechanism 8 adapted to turn levers 3 and 4 about the pivot pin 6.

According to the invention, levers 3 and 4 are also interconnected by means of an articulation double-link member 9 consisting of links 10 and 11, and having a common articulation joint 12, kinematically connected with a mechanism 8 for turning levers 3 and 4, which is a known in the art double-acting mechanism adapted for reciprocating the common articulation joint 12 described in more detail in the following portions of the disclosure. The resilient means 7 is so positioned that it acts towards pressing the brake shoes 2 to the disk 1.

Figure 2:
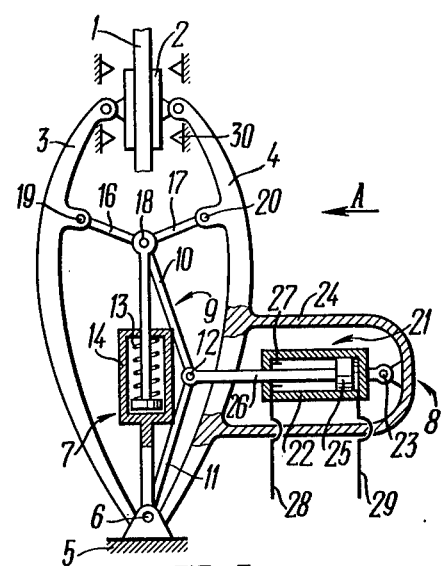
FIG. 2 is a side view of the the braking gear shown in FIG. 1 with the brake shoes pressed to the member to be braked.
Figure 3:
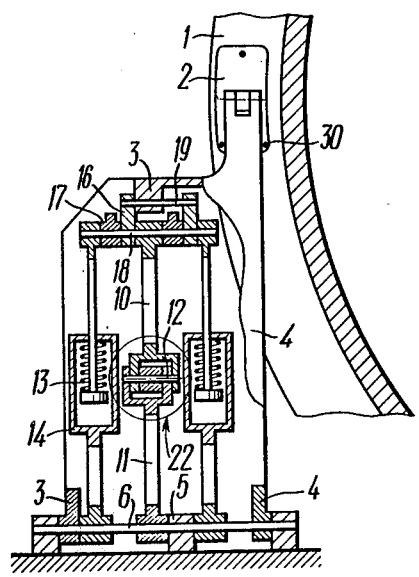
FIG. 3 is a fragmentary side view on an enlarged scale of the braking gear of FIG. 1 in the direction of arrow A.

FIGS. 1 and 2 schematically represent the braking gear, in accordance with one embodiment of the invention, which comprises brake shoes 2 pivotally joined with levers 3 and 4 which in their turn are mounted on the common pivot pin 6 connected to the base 5.

Levers 3 and 4 are interconnected by means of the resilient means 7 comprising a compression spring 13 which acts towards the pressing brake shoes 2 to the disk 1, the spring being enclosed inside a cylindrical housing 14 to guard it against soiling and environmental effects.

The present embodiment of the invention utilizes two identical compression springs 13 (FIG. 3), operating simultaneously with the aim of balancing the entire braking gear, however for simplicity of the disclosure only one spring will be referred to hereinafter. Besides, other structurally differing devices, such as tension springs or air-operated power cylinders can be used as the resilient means 7.

The compression spring 13 is connected with its one end through cylindrical housing 14 to the base 5 and through levers 3 and 4 to the pivot pin 6, and with its other end it is hinged to levers 3 and 4 through a rod 15 and two identical tie rods 16 and 17 interconnected by the articulation joint turning on a pivot pin 18. Tie rods 16 and 17 are hinged with levers 3 and 4 by means of pivot pins 19 and 20 respectively.

In accordance with the invention, levers 3 and 4 are joined by means of an articulation double-link member 9. The articulation double-link member 9 consists of links 10 and 11, each with its one end united into common articulation joint 12, and the other its ends being connected to the pivot pin 6 on one side and to the pivot pin 18 on the other, and further by means of tie rods 16 and 17 to levers 3 and 4.

The mechanism 8 for turning levers 3 and 4 about the pivot pin 6 is hinged on one of the levers, in this instance the lever 4, though it may be a lever 3 by virtue of the symmetrical arrangement of the braking gear components. The mechanism 8 for turning levers 3 and 4 contains an actuating cylinder, viz. hydraulic double-acting cylinder 21 in which the stationary member consisting of cylinder 22 is hinged by means of a pivot pin 23 with a bracket 24 which is attached to the lever 4, and the movable member consisting of a piston 25 and a piston rod 26 is connected with the common articulation joint 12 of the articulation double-link member 9.

Other means such as an air-operated power cylinder, screw non-selfbraking or rack-type drive operated from an electric motor can be equally adapted for turning the levers.

The hydraulic cylinder 21 contains a stop 27 whose purpose will be clear from the description of operation of the braking gear. Both cavities of the hydraulic cylinder 21 separated by a piston 25 are connected with the pumping station by way of pipelines 28 and 29 through a controlled double-acting slide valve (the system of control of hydraulic cylinder 21 is not shown in the drawing, since it is a well-known arrangement).

To provide for stability of the entire arrangement the braking gear is equipped with common stops 30 secured on the base 5. Said stops 30, if required, can be made adjustable. The position of the stops can be adjusted with the aid of a device well known to those skilled in the art, for example, with the aid of a screw and nut arrangement.

In operation, the braking gear may be in one of two fixed positions. To stop the tumbling mill, pressure fluid is forced to the cavity of the hydraulic cylinder 21 by way of a pipeline 28 (FIG. 1), due to which the piston 25 and together with it the rod 26 start to move to the right in the plane of the drawing. Under the action of the piston rod 26 the links 10 and 11 strive to move apart the pivot pins 6 and 18, hence, compress the compression spring 13, in other words, to withdraw the ends of the articulation double-link member 9. Since the pivot pin 6 is fixed with respect to the base 5, whereas the pivot pin 18 is movable, then, as a result of the withdrawal of the ends of the articulation double-link member 9, pivot pins 19 and 20 also move apart from one another under the action of tie rods 16 and 17. Withdrawal of pivot pins 19 and 20 forces levers 3 and 4 apart, i.e. causes withdrawal of shoes 2 from the disk 1 for a maximum distance.

When the piston rod 26 moves to the right, links 10 and 11 occupy a position in which they make up a straight line, and in this position the shoes 2 are at a maximum distance from the disk 1. This position due to the action of the spring 13 is unstable and is referred to as neutral.

Then during a further movement of the piston rod 26 to the right, the common articulation joint 12 passes over the neutral position and under the action of the hydraulic cylinder 21 and the compression spring 13 the ends of the articulation double-link member 9 draw together, due to which the pivot pins 19 and 20 draw together, whereas the levers 3 and 4 press the shoes 2 to the disk 1, thus providing for braking the tumbling mill.

In this position all levers 3 and 4 of the braking gear are fixed. The discontinuance of pressure fluid supply to hydraulic cylinder 21 will not cause the release of the braking gear, because brake shoes 2 are now pressed to the disk 1 by the spring 13 which always tends to draw together the ends of the articulation double-link member 9 and to shift the common articulation joint 12 away from the neutral position line.

The disk 1 is released when pressure fluid is supplied by way of pipe-line 29 to the cavity of the hydraulic cylinder 21. Then the piston 25 moves to the left with respect to all the parts of FIG. 2, pushing the piston rod 26. Under the action of the piston rod 26 links 10 and 11 overcome the pressure of the compression spring 13 and draw apart pivot pins 6 and 18. Due to the fact that the end of the link 11 joined to the pivot 6 is fixed with respect to the base 5, the end of the link 10 will move up, pushing the tie rods 16 and 17 which draw apart levers 3 and 4 and remove shoes 2 from the disk 1. In the process of a further movement of the piston rod 26 to the left the common articulation joint 12 passes through the neutral position, the pivot pins 6 and 18 draw together, and respectively brake shoes 2 approach the disk 1. When the piston 25 comes up to stop 27 the supply of pressure fluid to the hydraulic cylinder discontinues and the levers become fixed in position by the compression spring 13 on one side and by the stop 27 on the other, thus providing for an assured clearance B between the disk 1 and the brake shoes 2.

The cessation of supply pressure fluid to the hydraulic cylinder 21 in this position is possible due to the fact that the common articulation joint 12 acted upon by the compression spring 13 which tends to bring together the ends of articulation double-link member 9 cannot return to the neutral position and pass it over. The common articulation joint 12 can not move further from the position it occupies, since the length of the piston rod 26 is such that in this position the piston 25 thrusts against the stop 27. Thus levers 3 and 4 of the braking gear are fixed.

Referring to FIGS. 1 and 2 it should be noted that the length of the stroke of the common articulation joint 12 from the initial position, when brake shoes 2 are withdrawn from the disk 1 and the clearance B is assured, to the neutral position, when links 10 and 11 are arranged on one straight line, is less than the length of its stroke from the neutral position to the end position when brake shoes 2 are pressed to the disk 1. The ratio between the length of stroke of the common articulation joint 12 to the neutral position and the length of its stroke after passing the neutral position both directions is dependent on the general arrangement of the braking gear, however, the length of the stroke from the neutral position to the end position in which brake shoes 2 are pressed to the disk 1 must always be greater than the length of its stroke from the neutral position to the position in which brake shoes 2 are withdrawn from the disk 1.

It is clear from the above that the fixing of the two end positions of the common articulation joint 12 of the double-link member 9, hence of levers 3 and 4 both in the closed and open positions of the braking gear provides for a reliable operation and safe maintenance of the machines of which the braking gear is utilized. The connection of levers 3 and 4 between themselves, as well as with the mechanism 8 for turning levers 3 and 4 and with the base 5 by means of the articulation double-link member 9 and tie rods 16 and 17 provides for a multi-fold increase in the braking effort in view of the fact that the hydraulic cylinder 21 operates in the straight line zone when the common articulation joint passes the neutral position (the first boost stage), and in a zone close to the straight line (the second boost stage).

For the same reason, load on the resilient means 7 is reduced which increases efficiency thereof in two end positions of common articulation joint 12.

Alternatively the embodiment of the invention disclosed in FIGS. 4 and 5 includes the resilient means 7 acting towards pressing brake shoes 2 to disk 1 and the articulation double-link member 9 with interconnect levers 3 and 4 by means of pivot pins 19 and 20. It is to be understood that the resilient means 7 or the articulation double-link member 9 may connect levers 3 and 4 in other points located from the pivot pin 6 at a distance determined by specific design considerations, however the above arrangement has been accepted as most suitable for industrial production.

Mechanism 8 for turning levers 3 and 4 by means of its stationary member, namely, the cylinder 22, is hinged to the levers through the pivot pin 6, and by means of the movable member, i.e. the piston rod 26 attached to the piston 25, is hinged to the common articulation joint 12. The cylinder 22 may be hinged also to one of the levers 3 or 4 not through the pivot pin 6 but by any other way known to those skilled in the art, for example, through a lug or ear provided on one of the levers.

The braking gear in accordance with the above embodiment of the invention operates similarly to the braking gear in accordance with the first-mentioned embodiment thereof.

The braking gear in accordance with the present invention is noted for higher braking torque in comparison with similar prior art devices, providing for a reliable fixing of the closed and open positions.

While the invention has been described herein in terms of a limited number of embodiments, numerous variations may be made in the apparatus illustrated in the drawings and herein described without departing from the scope of the invention as set forth in the appended claims.

What is claimed is:

1. A braking gear comprising, two symmetrical arcuate brake levers pivoted at one end about a common pivot point and symmetrically disposed about an axis of symmetry passing through said common pivot point, two brake shoes each mounted on a free end of a respective one of said arcuate brke levers, each said free end being spaced from said common pivot point, a toggle system having two levers each pivotally connected to a corresponding arcuate brake lever and pivotally connected at a pivot at one end on said axis of symmetry, and having a third lever disposed along said axis of symmetry connected at the last-mentioned pivot and disposed extending axially between the arcuate brake levers, means to actuate said third lever axially to move said pivot of said two levers along the axis of symmetry to move the free ends of the arcuate levers toward each other or away from each other to thereby move the brake shoes toward said axis of symmetry for braking a moving element disposed between the brake shoes or away from said axis of symmetry, and fluid-actuated, double-acting means to additionally vary the distance between pivot points at which said two levers are connected to said arcuate levers thereby to additionally variably control the movement of said brake shoes toward and away from said axis.

2. A braking gear according to claim 1, in which said means to actuate said third lever comprises a cylinder pivotally connected to said common pivot point, and means in said cylinder for actuating said third lever axially.

3. A braking gear according to claim 1, in which said means to additionally vary the distance between said pivot points comprises a second system of toggle levers connected to said common pivot and said pivot on said axis of symmetry.

4. A braking gear comprising, two symmetrical arcuate brake levers pivoted at one end about a common pivot point and symmetrically disposed about an axis of symmetry passing through said common pivot point, two brake shoes each mounted on a free end of a respective one of said arcuate brake levers, each said free end being spaced from said common pivot point, a toggle system having two levers each pivotally connected to a corresponding arcuate brake lever and pivotally connected at a pivot at one end on said axis of symmetry, and having a third lever disposed along said axis of symmetry connected at the last-mentioned pivot and disposed extending axially between the arcuate brake levers, means to actuate said third lever axially to move said pivot of said two levers along the axis of symmetry to move the free ends of the arcuate levers toward each other or away from each other to thereby move the brake shoes toward said axis of symmetry for braking a moving element disposed between the brake shoes or away from said axis of symmetry, and means to additionally vary the distance between said arcuate levers comprising a cylinder pivotally connected to one of said arcuate levers and having a piston reciprocable therein having a piston rod connect to the other of said arcuate levers variably varying said distance between the arcuate levers with said means to actuate said third lever.

* * * * *